United States Patent
Beisiegel et al.

(10) Patent No.: US 7,594,217 B2
(45) Date of Patent: Sep. 22, 2009

(54) MATCHING CLIENT INTERFACES WITH SERVICE INTERFACES

(75) Inventors: Michael Beisiegel, Poughkeepsie, NY (US); Stephen Andrew Brodsky, Los Gatos, CA (US); Jean-Sebastien Michel Delfino, San Carlos, CA (US); Zhaohui Feng, Fremont, CA (US); Anh-Khoa Dinh Phan, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 574 days.

(21) Appl. No.: 11/007,753

(22) Filed: Dec. 7, 2004

(65) Prior Publication Data

US 2006/0122958 A1    Jun. 8, 2006

(51) Int. Cl.
G06F 9/44 (2006.01)
G06F 15/16 (2006.01)
(52) U.S. Cl. .................................. 717/107; 709/237
(58) Field of Classification Search ................ 717/107, 717/116, 121; 709/217
See application file for complete search history.

(56) References Cited

U.S. PATENT DOCUMENTS

| | | | | |
|---|---|---|---|---|
| 5,339,430 | A * | 8/1994 | Lundin et al. | 719/332 |
| 5,960,421 | A | 9/1999 | Cline et al. | |
| 6,438,744 | B2 * | 8/2002 | Toutonghi et al. | 717/137 |
| 6,446,064 | B1 | 9/2002 | Livowsky | |
| 6,448,981 | B1 * | 9/2002 | Kaczmarski | 715/763 |
| 6,643,652 | B2 | 11/2003 | Helgeson et al. | |
| 7,171,673 | B1 * | 1/2007 | Steinman et al. | 719/331 |
| 2002/0026471 | A1 * | 2/2002 | Bent et al. | 709/101 |
| 2002/0152210 | A1 | 10/2002 | Johnson et al. | |
| 2003/0093551 | A1 * | 5/2003 | Taylor et al. | 709/237 |
| 2004/0012626 | A1 | 1/2004 | Brookins | |
| 2004/0148569 | A1 | 7/2004 | Sengodan | |
| 2004/0148570 | A1 | 7/2004 | Sengodan | |

(Continued)

FOREIGN PATENT DOCUMENTS

EP    1130510    9/2001

(Continued)

OTHER PUBLICATIONS

Heiss, J. J., "JAX-RPC Brings Portability to Web Services", [online], [Retrieved on Nov. 23, 2004]. Retrieved from the internet at <URL: http://java.sun.com/features/2003/01/jax_rpc.html>.

(Continued)

*Primary Examiner*—Tuan Q Dam
*Assistant Examiner*—Isaac T Tecklu
(74) *Attorney, Agent, or Firm*—David Victor; Konrad Raynes & Victor LLP (57) ABSTRACT

Provided are a method, system, and program for matching client interfaces with service interfaces. A client component includes at least one client interface and a target component includes at least one service interface. A data structure for the client component associates at least one client interface in the client component with one target component. For each client interface indicated in the data structure, a determination is made as whether there is one service interface in the target component associated with the client interface that is compatible with the client interface.

33 Claims, 7 Drawing Sheets

U.S. PATENT DOCUMENTS

2004/0168153 A1* 8/2004 Marvin .................. 717/120
2005/0154785 A1* 7/2005 Reed et al. ............... 709/217

FOREIGN PATENT DOCUMENTS

WO    WO-03/069464    8/2003

OTHER PUBLICATIONS

Horrell, S., "Introducing JAX-RPC: Build and Access Web Services based on Synchronous RPC-oriented SOAP messaging", [online], © 2001-2004 Fawcette Technical Publications, [Retrieved on Nov. 23, 2004]. Retrieved from the Internet at <URL: http://www.fawcette.com/javapro/2002%5F05/magazine/features/shorrell/default_pf.aspx>.

Prohorenko, O., "Local and Remote EJB Interfaces", [online], Nov. 3, 2004, [Retrieved on Dec. 2, 2004]. Retrieved from the Internet at <URL: http://www.onjava.com/lpt/a/5389>.

Sharma, R., "Java API for XML-based RPC (JAX-RPC): A Primer", [online], © 1994-2004 Sun Microsystems. [Retrieved on Nov. 23, 2004]. Retrieved from the Internet at <UR:: http://java.sun.com/xml/jaxrpc/primerarticle.html>.

Sun Microsystems, Inc., "J2EE Connector Architecture", *White Paper*, [online], [Retrieved on Nov. 23, 2004]. Retrieved from the Internet at <URL: http://java.sun.com/j2ee/white/connector.html>.

* cited by examiner

MATCHING CLIENT INTERFACES WITH SERVICE INTERFACES

BACKGROUND OF THE INVENTION

1. Field of the Invention

The present invention relates to a method, system, and program for matching client interfaces with service interfaces.

2. Description of the Related Art

Software developers often want to integrate business applications with various business services, such as web services, legacy applications, databases, Enterprise Information Systems (EIS), etc. One solution is the J2EE Connector Architecture, part of Java 2, Platform, Enterprise Edition (J2EE) 1.3, that specifies a standard architecture for accessing resources in diverse Enterprise Information Systems (EIS). The J2EE platform provides a reusable component model, using Enterprise JavaBeans and JavaServer Pages technologies to build and deploy multi-tier applications that are platform and vendor-independent. (Java, J2EE, Enterprise JavaBeans, and JavaServer Pages are trademarks of Sun Microsystems, Inc.).

A developer uses J2EE by writing, for each service to which the application connects, one Connector Architecture-compliant resource adapter. Each application extends its system once to support integration with any number of resource adapters and underlying services, such as web services, legacy applications, databases, Enterprise Information Systems (EIS), etc.

An Enterprise Java Bean (EJB) is a collection of Java classes, following defined rules and providing specific callback methods, and an XML file, combined into one single unit. Session beans model business services and expose EJB remote interfaces, which a client will use to invoke the services.

A developer of an application may want to expose a target component and service interfaces to a client component and client interfaces to allow the execution of the client interface to result in the execution of a corresponding service interface in the target component, which may be on a remote server. Thus, the client interface is mapped to the service interface, where the client and service interfaces may be implemented in different computer languages. The Java API for XML Based RPC (JAX-RPC) provides a technique to bind a client interface to a service interface that executes on a remote machine. A service client uses a JAX-RPC service by invoking remote methods on a service endpoint. A JAX-RPC service client can call a service endpoint that has been defined and deployed on a non-Java platform. The invoked service endpoint may comprise a web service. With JAX-RPC the client and the target service share an interface/contract described by a WSDL document (Web Services Description Language).

SUMMARY

Provided are a method, system, and program for matching client interfaces with service interfaces. A client component includes at least one client interface and a target component includes at least one service interface. A data structure for the client component associates at least one client interface in the client component with one target component. For each client interface indicated in the data structure, a determination is made as whether there is one service interface in the target component associated with the client interface that is compatible with the client interface.

DETAILED DESCRIPTION

In the following description, reference is made to the accompanying drawings which form a part hereof and which illustrate several embodiments of the present invention. It is understood that other embodiments may be utilized and structural and operational changes may be made without departing from the scope of the present invention.

Figure 1:
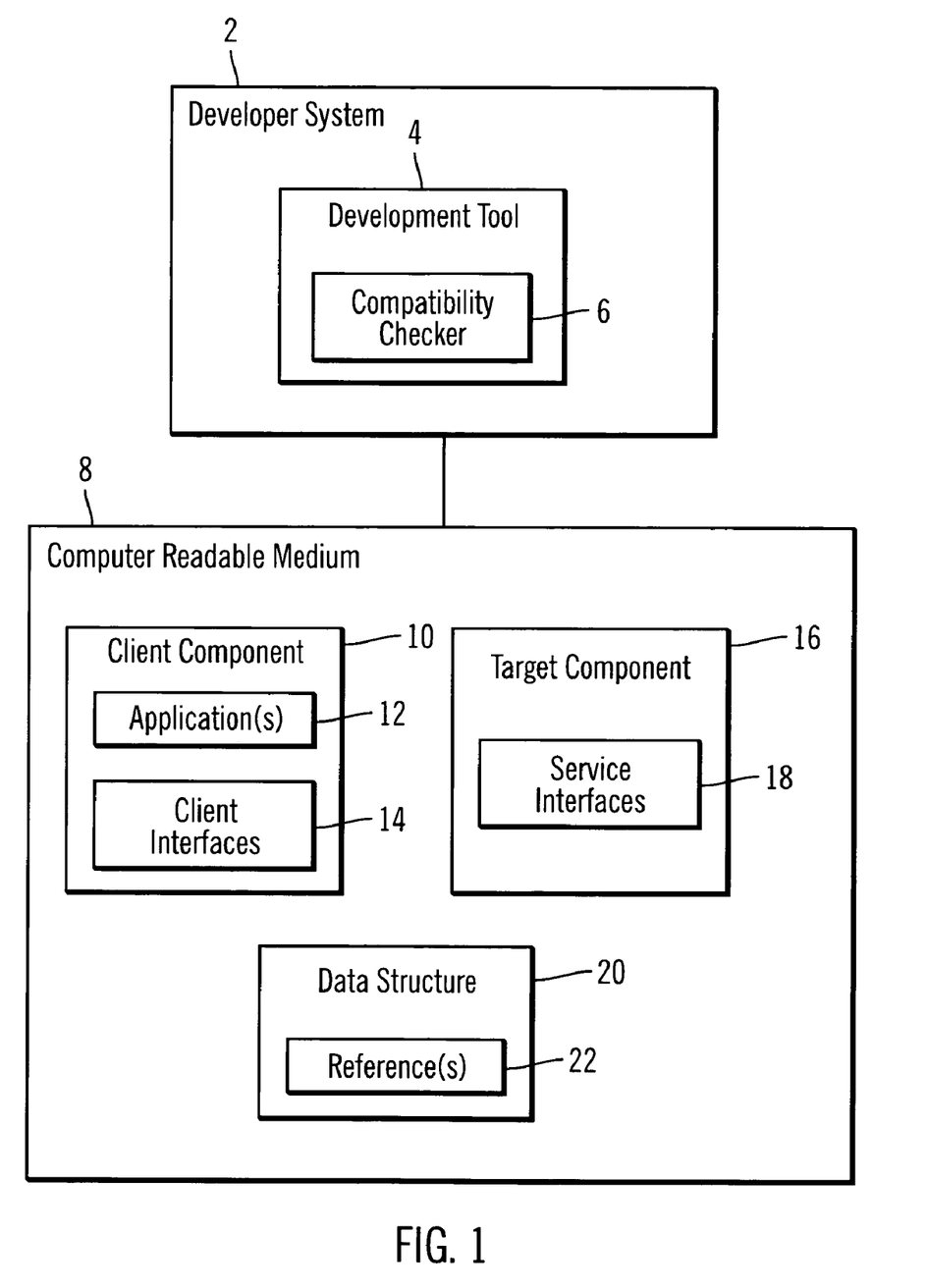
FIGS. 1 and 3 illustrate embodiments of computing environments.

FIG. 1 illustrates a computing environment comprising a developer computer system 2 having a development tool 4 including a compatibility checker program 6 that is coupled to a computer readable medium 8, comprising a volatile or non-volatile storage or memory. The computer readable medium 8 may comprise a local storage device of the computer system 8, external storage or an internal memory. The computer readable medium 8 includes a client component 10 including one or more applications 12 being developed and client interfaces 14 that the application 12 calls to execute. As part of the development environment, the computer readable medium 8 further includes a target component 16 comprising service interfaces 18, where certain of the client interfaces 14 are intended to map to service interfaces 18 in a target component 16, that may be executed locally or remotely in a server-side system. The developer would further code a data structure 20 that has one or more references 22 providing information on certain of the client interfaces 14 that map to service interfaces 18 in the target component 16. The compatibility checker 6 is invoked to determine the compatibility of client interfaces 14 and the service interfaces 18 to which they map according to the references 22 indicated in the data structure 20.

The compatibility checker 6 is invoked to determine the compatibility of client interfaces 14 and the service interfaces 18 to which they map according to the references 22 indicated in the data structure 20. A wire comprises a specification that links a reference with service interfaces that will resolve the reference at run-time. A wire may only link a reference and a service if the service interfaces 18 are compatible with the interface of the reference. Two interfaces are compatible if the methods on the target service interfaces 18 are a superset of the methods in the interface specified on the reference. Thus, wiring comprises the process of linking a reference with a service interface to map the client interface 14 to corresponding service interfaces 18 implementing the functionality of the client interfaces 14 in a separate component.

In one embodiment, the client and service interfaces are compatible, i.e., match, if the operations of the client and service interfaces have the same names and the types they flow are compatible. In one embodiment, a pre-defined Java to XML Schema Definition (XSD) mapping may be used to determine if types from the Java and XSD type systems are compatible (using the Service Data Objects (SDO)-Java to XSD mapping. Further, the compatibility checker may handle the various WSDL interface styles used in Web Services, used to represent operations that flow a single complex type, where the single complex type will match a Java complex type/Java Bean RPC that represents operations that flow multiple parameters. Each part in the WSDL message maps to a parameter on a Java method. The doc-literal-wrapped is used in WSDL to wrap multiple parameters under a single complex type. In such case, the wrapper is discarded and the individual elements under the wrapper a considered for mapping to parameters on a Java method.

A service reference is wired by containing zero or more wire elements (depending on multiplicity) in the reference. A wire element has a target attribute that contains the name of the service interface 18 that will resolve the reference. Each reference is typed by an interface. For a reference having a multiplicity of one, each reference is connected by a wire to a target component. The target component exposes one or more interfaces. The compatibility checker 6 checks the compatibility of the interface specified on the reference with the set of interfaces exposed by the target component. For a reference having a multiplicity of many, the-reference is connected to one or more components, using one or more wires. The compatibility checker 6 checks the compatibility of the interface specified on the reference with all the target components.

Figure 2:
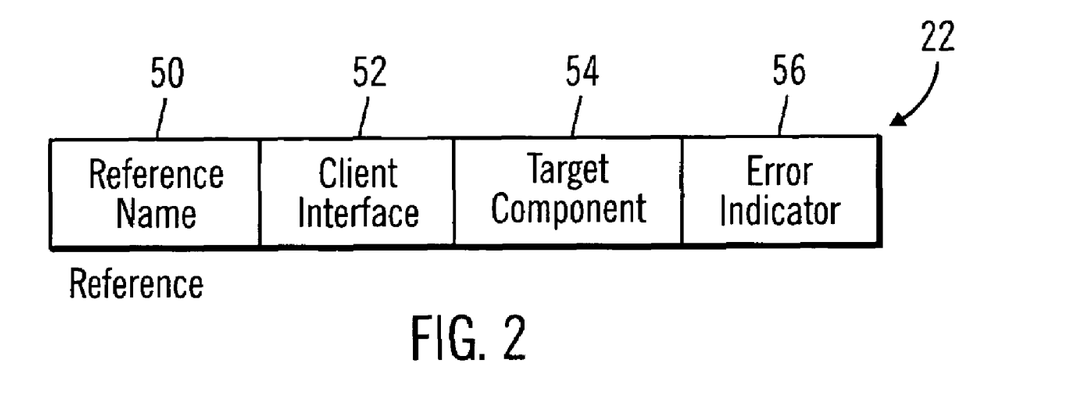
FIG. 2 illustrates an embodiment of a reference associating a client interface with a target component.

FIG. 2 illustrates an embodiment of information provided with each reference 22, including: a reference name 50 or identifier; a name of a client interface 52 and a target component 54 including the service interface 18 that implements the functionality of the client interface 52 in a service runtime environment; and an error indicator 56 indicating whether the mapping identified in the reference 22 is incompatible or compatible.

In certain embodiments, the client interfaces 14 in one client component 10 may be coded in one computer language and the service interfaces 18 in one target component 16 may be coded in a different computer language. For instance, the client component 16 may be coded in the Web Service Description Language (WSDL), Business Process Execution Language (BPEL), etc., and the target component 16 may be coded in another language, such as Java. (WSDL is used to describe interfaces, BPEL is used to code business process logic). A client interface 14 and one corresponding service interface 18 implementing the client interface 14 functionality in the target component 16 are compatible if methods in the service interface 18 are a superset of methods in the client interface 14.

Figure 3:
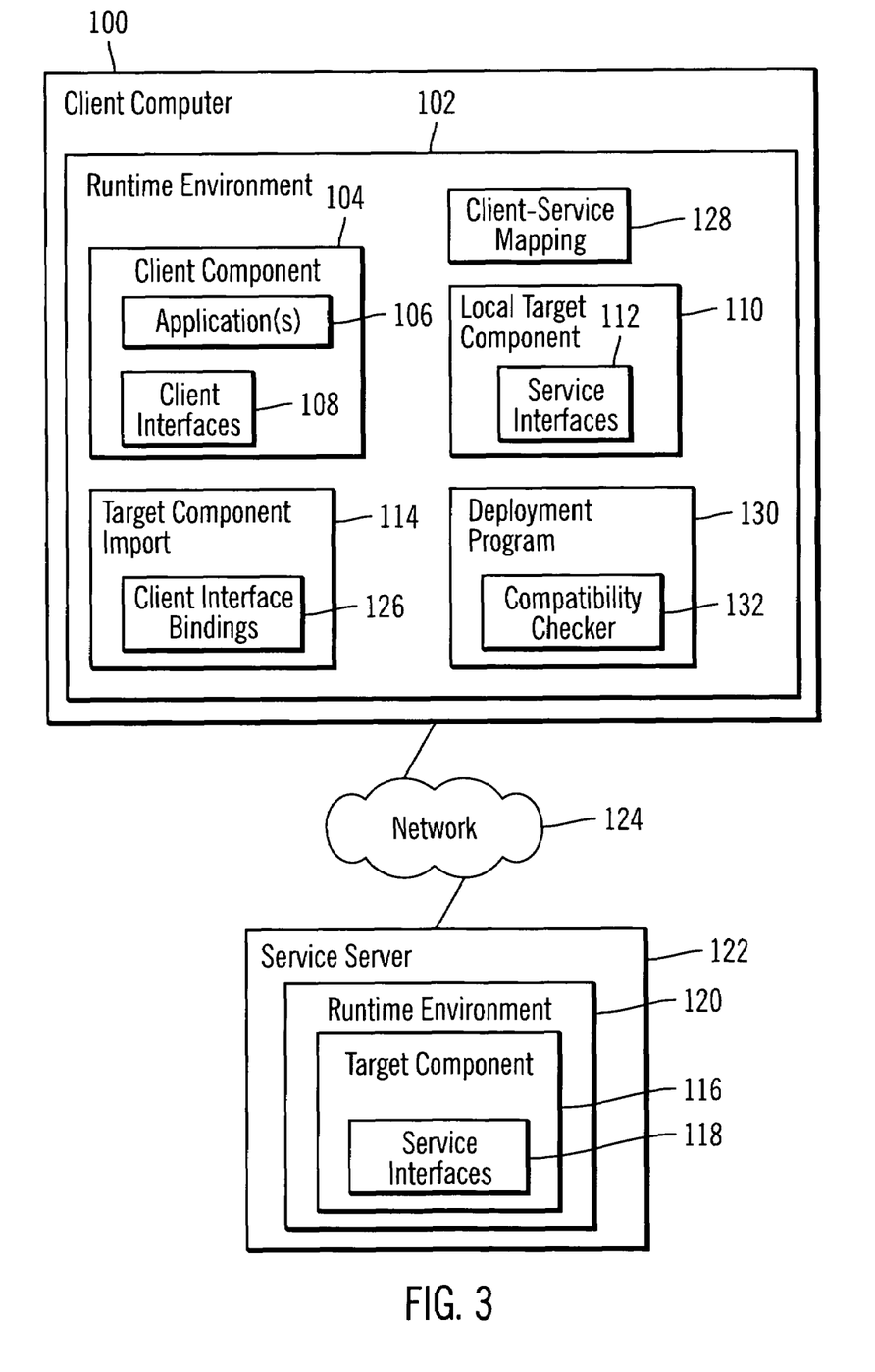

FIG. 3 illustrates a computing environment including a client system 100 having a runtime environment 102 including a compiled client component 104 including client applications 106 and client interfaces 108. The runtime environment 102 includes compiled client application(s) 12 and client interfaces 14 called the client applications 12. The client runtime environment 102 includes a compiled local target component 110 having service interfaces 112, where the local service interfaces 112 may be in a different language than the client interfaces 108. The client runtime environment 102 further includes a target component import 114 that represents a target component 116 whose service interfaces 118 execute in a runtime environment 120 executing in a remote service server 122. The remote server 122 and client system 100 communicate over a network 124, which may comprise any suitable network known in the art. The client runtime environment 102 includes a client interface binding 126 of the client interfaces 16 to a protocol and the address of the target service interfaces 112, where the remote service interfaces 118 execute in a server runtime environment 120 of the remote service server 122. The client runtime environment 102 further includes a client-service mapping 128 that is generated from the references 22 to identify one service interface in one associated target component (local or remote) that implements the client interface 108. The client-service mapping 128 may further map parameters, such as arguments, returns, and exceptions, defined for the client interfaces 108 to parameters (e.g., arguments, returns, and exceptions) of the service interface 112, 118. This mapping 128 allows a call to a client interface 108 to map to a call to a service interface and the parameters included in the call to the client interface 108 to map to parameters in the call to the service interface.

A deployment program 130, such as a class loader, loads and instantiates the client components 104, local target component 110, target component import 114, and binding 126 in the runtime environment 102. The deployment program 130 uses a compatibility checker 132, which may perform the operations of compatibility checker 6, to determine service interfaces 112, 118 in a target component 110, 116 that implements the operations of a client interface 108 in the target component 110, 116 associated with the client interface 108 in one reference 22.

The service interfaces mapping to one client interface in the client-service mapping 128 may comprise a service interface 112 in a local target component 110 that executes in the client runtime environment 102 or may comprise a service interface 118 in a remote service server 122 that is accessed through the binding 126 of the service interfaces to remote services. As discussed, the client applications 106 and client interfaces 108 called by the applications 116 may be implemented in one computer language and the service interfaces 112, 118 in a different computer language.

Figure 4:
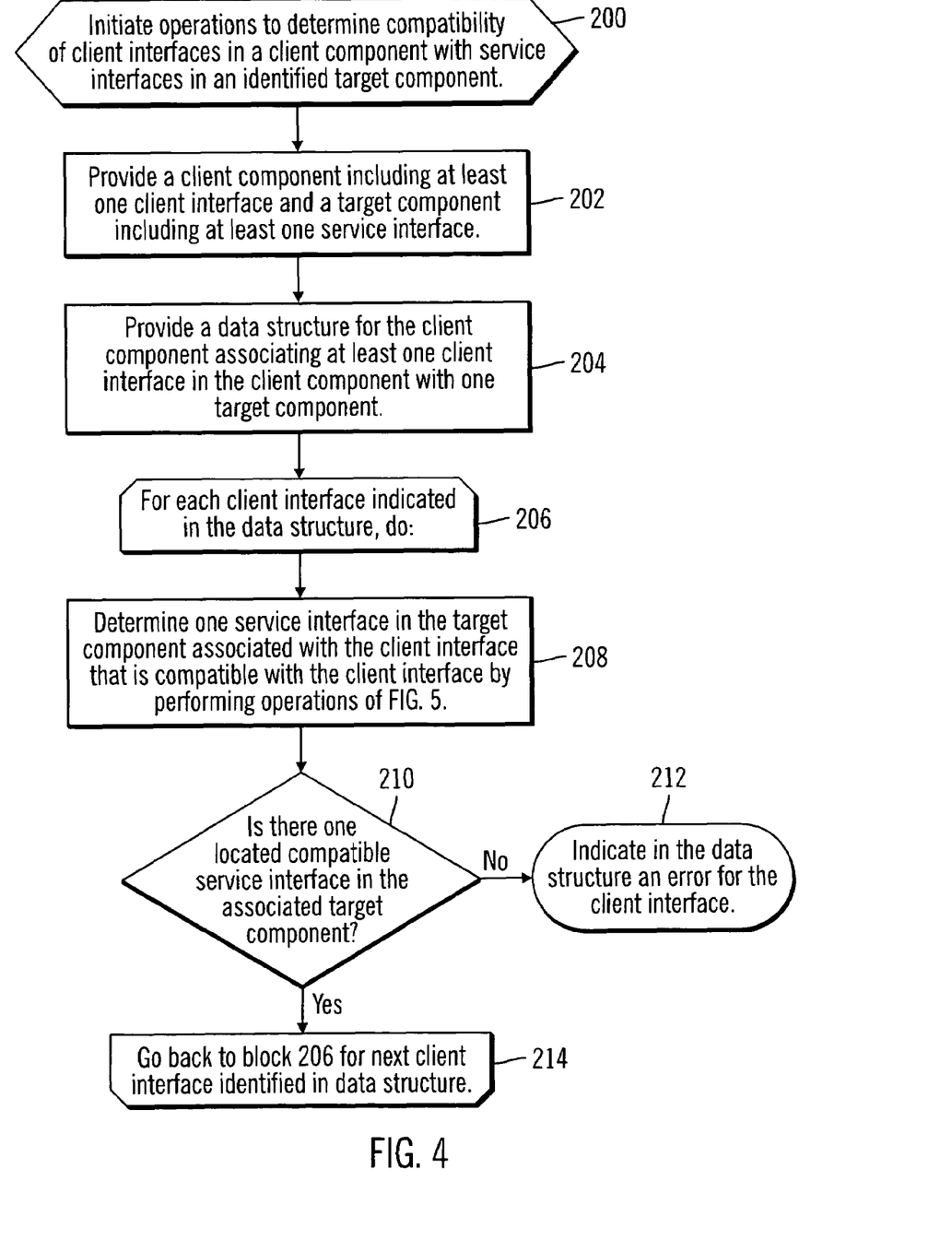
FIGS. 4 and 5 illustrate an embodiment of operations to determine the compatibility of client interfaces and a service interface in a target component.

FIG. 4 illustrates an embodiment of operations performed by the development tool 4 in a development environment. Upon initiating (at block 200) operations to determine the compatibility of client interfaces 14 in a client component 10 with service interfaces 18 in an identified target component 16, the development tool 4 is provided (at block 202) a client component 10 including at least one client interface 14 and a target component 16 including at least one service interface 18. In one embodiment, the target component 16 and service interfaces 18 may be identified by a Uniform Resource Identifier (URI) identifying the service interfaces 18 in a remote server over a network, so the most current version of the target component 16 and service interfaces 18 may be represented as an import, which comprises a local definition, similar to a component, that exposes the service interfaces 18 compatible with the client interfaces 14. The development tool 4 is further provided (at block 204) with a data structure 20 for the client component 10 associating at least one client interface 14 in the client component 12 with one target component 16.

In one embodiment, the data structure 20 may include references 22, such as shown in FIG. 2, where each reference 22 identifies one client interface 52 and associated target component 54 that is intended to include one service interface 18 implementing the client interface 14. In this way, the data structure 20 includes references to specify that an identified client interface 52 is implemented in one service interface in the associated target component 54. In certain embodiments, the reference 22 might not be wired to a target component 16, and may be wired dynamically at runtime if the address of the target component 16 is obtained at runtime or if the target component 16 does not exist, has not been coded yet, or is being simulated by a debugging/simulator tool. However, the client interface 14 for the reference 22 may be defined at authoring time.

The development tool 4 performs a loop of operations at blocks 206 through 214 for each client interface, i.e., reference 22, indicated in the data structure 20. Within the loop, a determination is made (at block 208) of one service interface 18 in the target component 16 associated with the client interface 14 that is compatible with the client interface. Each service interface 18 in the target component 16 may be checked to determine one that is compatible with the client interface 14 being considered. A service interface 18 and client interface 14 may be deemed compatible if methods in one service interface 18 are a superset of methods in the client interface 14 associated with the target component 16 including the service interface 18. In one embodiment, the operations in FIG. 5, discussed below, may be used to determine a compatible service interface 18 in the target component 16 associated with the client interface 14. If (at block 210) there is no service interface 18 compatible with the client interface 14 in the associated target component 16, then an error is indicated (at block 212) in the data structure 20. In one embodiment, the error indicator 56 is set in the reference 22 identifying the client interface 52 and target component 54 checked for compatibility. The user may then check this error condition when debugging the client component 10 to correct any problems. After setting the error indicator (at block 212) or if there is one compatible service interface 18 (from the yes branch of block 210), control proceeds (at block 214) back to block 206 to consider the compatibility of a next reference in the data structure 20.

Figure 5:
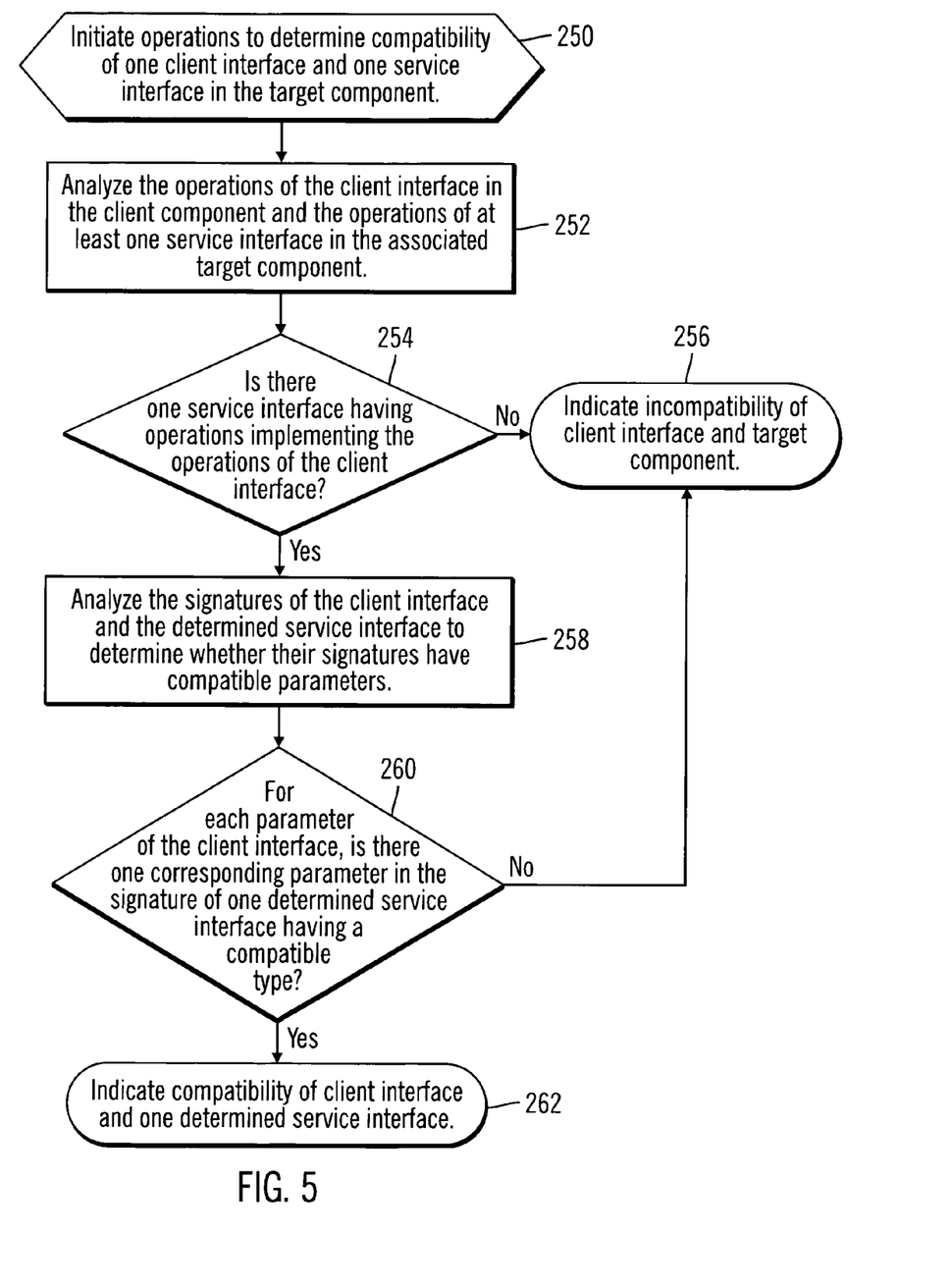

FIG. 5 illustrates an embodiment of operations implemented in a compatibility checker 6, 132 in a development or runtime environment, respectively, to determine the compatibility of one client interface 14 and one service interface 18 in a target component 16 a reference 22 associates with the client interface 14. Upon initiating (at block 250) an operation to determine the compatibility of one client interface and one service interface in the associated target component, the compatibility checker 6, 132 analyzes (at block 252) the operations of the client interface 14 in the client component 10 and the operations of at least one service interface 18 in the associated target component 16. If (at block 254) there no service interface 18 in the target component 16 associated with the client interface 14 having operations implementing the operations of the client interface 14, then the incompatibility of the client interface and the target component is indicated (at block 256), such as by setting the error indicator 56 (FIG. 2) in the reference 22. If (at block 254) there is one server interface 18 in the target component 16 implementing the operations of the client interface 14, then the compatibility checker 6, 132 analyzes (at block 258) the signatures of the client interface 14 and the determined service interface 18 to determine whether the their parameters (e.g., arguments, returns, exceptions, )indicated in their signatures are compatible. If (at block 260) for each parameter of the client interface 14 there is one corresponding parameter in the signature of one determined service interface 18 having a compatible type, then the compatibility of the client interface 14 and service interface 18 pair is indicated (at block 262). Otherwise, if the parameters of the client interface 14 and one service interface 18 in the associated target component 16 are not compatible, then the incompatibility of the client interface 14 and associated target component 16 is indicated, such as by setting the error indicator 56 in the reference associating the client interface 14 with the target component 16. If there are multiple service interfaces 18 in the target component 16 associated with the client interface 14 (via one reference 22) that have operations implementing the operations of the client interface 14, then the steps at blocks 252 and 254 may be performed for each service interface 18 implementing the client interface 14 operations to determine one that has parameters compatible with those of the client interface 14.

In the development environment, determining and indicating incompatibility of a client interface and target component may occur by setting the error indicator 56 to use for subsequent debugging operations by the development tool 4. Alternatively, in the runtime environment of FIG. 3 the operations of FIG. 5 may be used to dynamically locate the service interface 18 corresponding to the client interface 16 that will be called on behalf of the client interface 16 during runtime.

Figure 6:
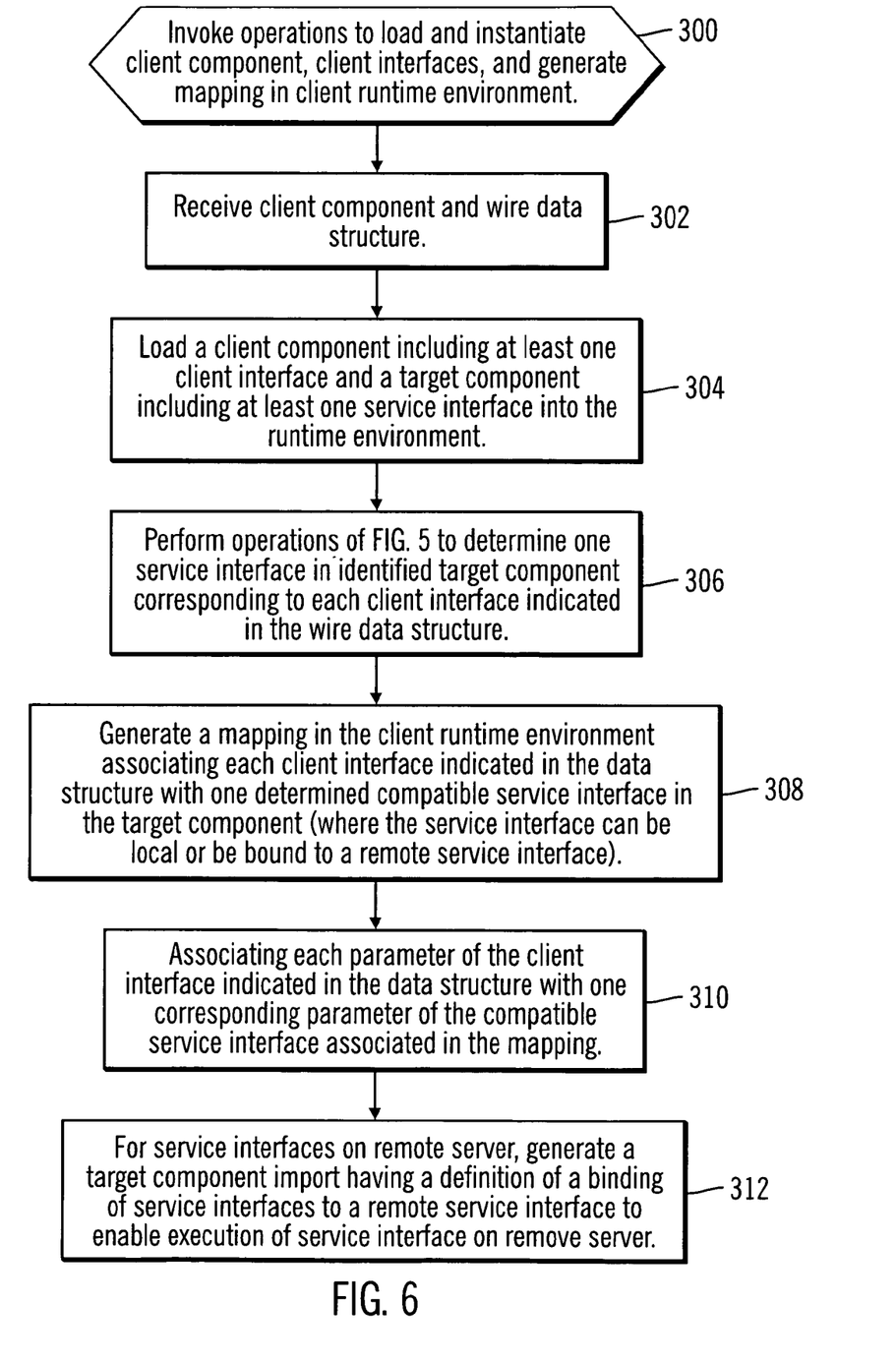
FIGS. 6 and 7 illustrate an embodiment of operations load an instantiate components into the runtime environment and use the components.

FIG. 6 illustrates operations implemented in the deployment code 130 to load and instantiate client components 104, client interfaces 108, local target components 110, and a client-service mapping 128 in the client runtime environment 102. Upon invoking the deployment code 130, the client component 104 and wire data structure 20 (FIG. 1) are received (at block 302) and the client component 104 and the at least one client interface 14 are loaded (at block 304) into the client runtime environment 102. The deployment code 130 compatibility checker 132 performs (at block 306) the operations of FIG. 5 to determine one service interface 18 in the identified target component 16 for each client interface 108 indicated in a reference 22 the data structure 20. A client-service 128 mapping is generated (at block 308) in the client runtime environment 102 by associating each client interface 108 indicated in a reference 22 in the data structure 20 with one determined compatible service interface 112 in the associated target component 110, 116 (where the service interface 18 can be to a local 112 or remote 118 service interface). The deployment code 130 then associates (at block 310) each parameter of the client interface 14 indicated in the data structure 20 with one corresponding parameter of the compatible service interface 18 associated in the client-service mapping 128. Further, for service interfaces 118 on a remote server 122 in a remote target component 116, a target component import 114 is generated (at block 312) having a definition of a binding 126 of client interfaces 108 to a remote service interface 118 to enable execution of the service interface associated with a client interface 108 on the remote server 122.

Figure 7:
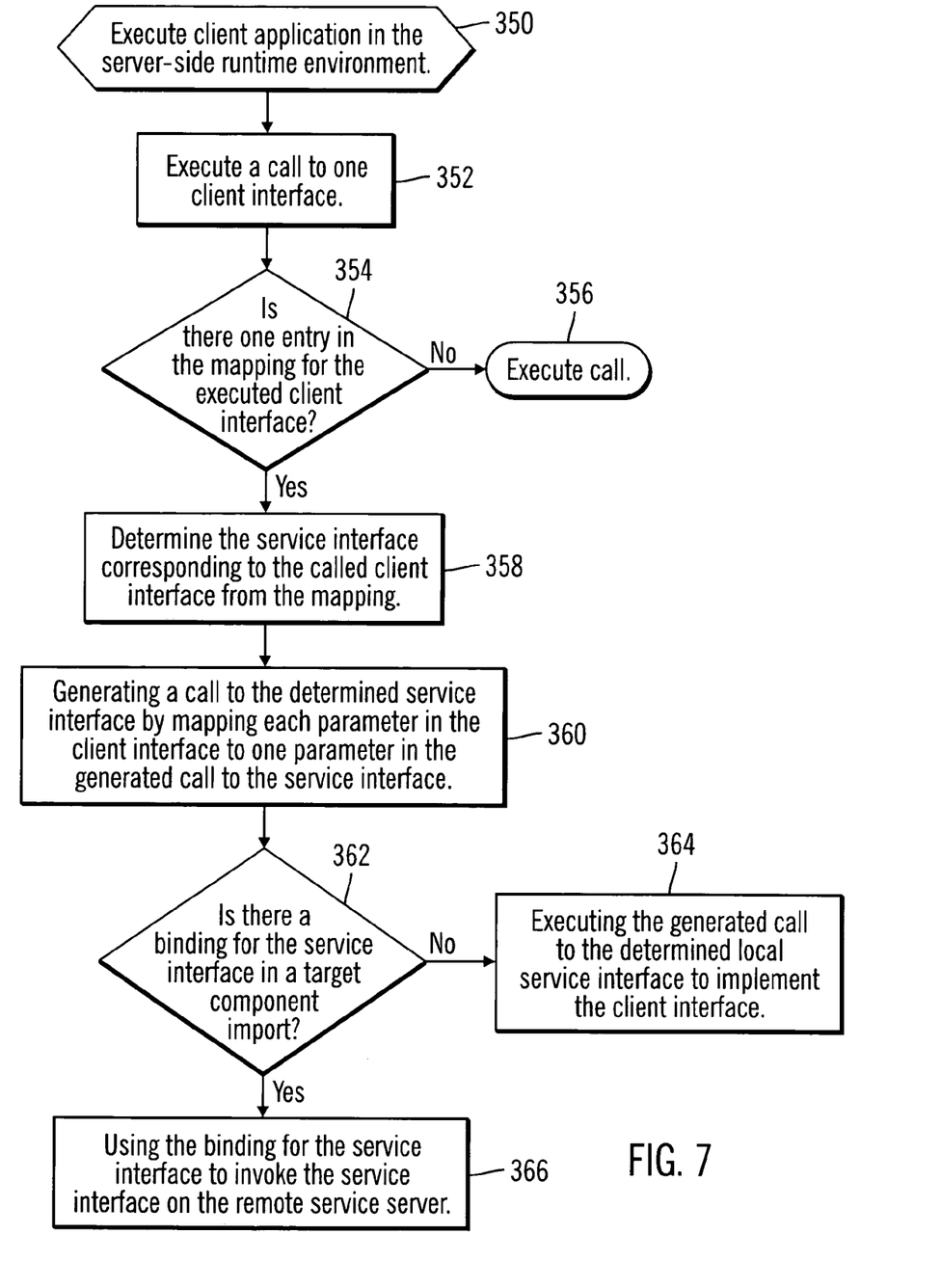

FIG. 7 illustrates operations performed in the client runtime environment 102 when the client application 106 executes client interfaces 108. Upon executing (350) one application 106 and executing (at block 352) a call to one client interface 108 in the executed application 106, a determination is made (at block 354) by the runtime environment 102 of whether there is one entry in the client-service mapping 128 for the executed client interface 108. If not then, the client interface 108 call is executed (at block 356) in the client runtime environment 102. Otherwise, if (at block 354) there is one entry in the client-service mapping 128, then the runtime environment 102 determines (at block 358) the service interface corresponding to the called client interface from the client-service mapping 128. A call to the determined service interface is generated (at block 360) by mapping each parameter in the client interface to one parameter in the generated call to the service interface.

Here is how we determine if the target component is local or remote:

Remote services are described locally by SCA Imports.

A wire can point to a component, e.g., local target component 110, when the component is local and resides in the same application/module as the client. A wire can point to a target component import 114, where the import is local and represents the remote service interfaces 118. Thus, the import exposes a set of interfaces and contains a binding that describes how to talk to the target service. If (at block 362)

there is no binding 126 for the service interface in a target component import 114, then the service interface is a local service interface 112 in a local target component 110. In such case, the generated call to the determined local service interface 112 is executed (at block 364) to implement the called client interface 108. Otherwise, if there is a binding 126 for the determined service interface, then the binding 126 for the service interface 118 is used (at block 366) to invoke the service interface 118 on the remote service server 122.

Described embodiments provide techniques to associate client interfaces in one client component with a target component. During debugging or when instantiating components and interfaces in the runtime environment, a determination may be made of one service interface in the target component associated with the client interface that implements the client interface and is compatible with the client interface. A client interface and one service interface 18 in the associated target component are compatible if methods in one service interface are a superset of methods in the client interface.

With the described embodiments, if the target component and service interfaces are on a remote service server, then the provider of the remote service server, which may comprise a Web service, may update the service interfaces to provide added functionality without requiring that existing client systems update their client components to take into account the changes as long as the updated service interfaces still form a superset of the methods of the client interface. Thus the described embodiments enable a web service provider to ensure down level compatibility between already existing client components and updated service interfaces.

ADDITIONAL EMBODIMENT DETAILS

The described operations may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration without departing from the scope of the present invention, and that the article of manufacture may comprise any information bearing medium known in the art.

The illustrated operations of FIGS. 4, 5, 6, and 7 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

The invention claimed is:

1. A method, comprising:
    providing a client component including at least one client interface, wherein the client components are loaded in a runtime environment;
    providing a target component including at least one service interface;
    providing a data structure for the client component associating at least one client interface in the client component with one target component;
    determining in the runtime environment, for each client interface indicated in the data structure, whether there is one service interface in the target component associated with the client interface that is compatible with the client interface, wherein the service interface in the target component associated with the client interface implements a functionality of the associated client interface in the target component;
    generating a mapping in the runtime environment associating each client interface indicated in the data structure with one compatible service interface in the target component and associating each parameter of the client interface indicated in the data structure with one parameter of the compatible service interface associated in the mapping;
    using the mapping in response to a call in the runtime environment to one client interface indicated in the mapping to generate a call to the service interface associated in the mapping with the client interface;
    mapping each parameter in the called client interface to one parameter in the generated call to the service interface, wherein the call to the service interface is executed to implement the call to the client interface; and
    indicating in the data structure an error for one client interface indicated in the data structure in response to determining that the client interface is not compatible with one service interface in the target component associated with the client interface.

2. The method of claim 1, wherein at least one reference identifies one client interface and a target component including one service interface corresponding to the identified client interface, wherein the data structure includes at least one reference to specify that the identified client interface is implemented in one service interface in the target component.

3. The method of claim 1, wherein determining whether there is one service interface in the target component associated with the client interface comprises:
    analyze operations of the client interface in the client component; and analyze operations of at least one service interface in the associated target component; and determining one service interface having operations implementing the operations of the client interface.

4. The method of claim 3, wherein the client interface is coded in a first computer language and the service interfaces in the target component are coded in a second computer language.

5. The method of claim 3, wherein the at least one client interface has a signature identifying parameters of the client interface and wherein the at least one service interface has a signature identifying parameters of the service interface, further comprising:

determining whether the signature of the determined service interface is compatible with the signature of the client interface.

6. The method of claim 5, wherein determining whether the signatures of the determined service interface and client interface are compatible comprises determining whether for each parameter of the client interface there is one corresponding parameter in the signature of the determined service interface having a compatible type.

7. The method of claim 1, wherein the indication of the error is made in a development environment to enable a developer to correct the error in compatibility.

8. The method of claim 1, wherein the runtime environment comprises a client runtime environment executing in a client system, wherein one target component and server interfaces therein execute in a remote server in communication with the client system over a network, further comprising:

generating a binding of a name of each service interface associated with one client interface in the mapping to an implementation of the service interface in the remote server to enable transmission of a call to the service interface to the remote server to execute in the remote server.

9. The method of claim 8, wherein a service provider enables access to service interfaces on the remote server that are bound to service interfaces called in the client runtime environment, further comprising:

updating, by the service provider, functionality of service interfaces in the server that are bound to services interfaces in one client environment; and deploying the updated service interfaces, wherein the updated service interfaces remain compatible with the client interface associated in the mapping in the client runtime environment.

10. The method of claim 1, wherein the client interface and one service interface in the target component are compatible if methods in one service interface are a superset of methods in the client interface.

11. The method of claim 1, wherein a compatibility checker in a development environment performs the determining, for each client interface indicated in the data structure, whether there is one service interface in the target component associated with the client interface that is compatible with the client interface, wherein indicating the error comprises setting an error indicator to use for subsequent debugging operations by a development tool.

12. A system in communication with a client component including at least one client interface and a target component including at least one service interface; comprising:

a processor;

a memory including a data structure for the client component associating at least one client interface in the client component with one target component; and a computer readable storage medium including code executed by the processor to perform operations, the operations comprising:

providing a client component including at least one client interface, wherein the client components are loaded in a runtime environment;

providing a target component including at least one service interface;

providing a data structure for the client component associating at least one client interface in the client component with one target component;

determining in the runtime environment, for each client interface indicated in the data structure, whether there is one service interface in the target component associated with the client interface that is compatible with the client interface, wherein the service interface in the target component associated with the client interface implements a functionality of the associated client interface in the target component;

generating a mapping in the runtime environment associating each client interface indicated in the data structure with one compatible service interface in the target component and associating each parameter of the client interface indicated in the data structure with one parameter of the compatible service interface associated in the mapping;

using the mapping in response to a call in the runtime environment to one client interface indicated in the mapping to generate a call to the service interface associated in the mapping with the client interface;

mapping each parameter in the called client interface to one parameter in the generated call to the service interface, wherein the call to the service interface is executed to implement the call to the client interface; and indicating in the data structure an error for one client interface indicated in the data structure in response to determining that the client interface is not compatible with one service interface in the target component associated with the client interface.

13. The system of claim 12, wherein at least one reference identifies one client interface and a target component including one service interface corresponding to the identified client interface, wherein the data structure includes at least one reference to specify that the identified client interface is implemented in one service interface in the target component.

14. The system of claim 12, wherein determining whether there is one service interface in the target component associated with the client interface comprises:

analyze operations of the client interface in the client component; and analyze operations of at least one service interface in the associated target component; and determining one service interface having operations implementing the operations of the client interface.

15. The system of claim 14, wherein the client interface is coded in a first computer language and the service interfaces in the target component are coded in a second computer language.

16. The system of claim 14, wherein the at least one client interface has a signature identifying parameters of the client interface and wherein the at least one service interface has a signature identifying parameters of the service interface, wherein the operations further comprise:

determining whether the signature of the determined service interface is compatible with the signature of the client interface.

17. The system of claim 16, wherein determining whether the signatures of the determined service interface and client interface are compatible comprises determining whether for each parameter of the client interface there is one corresponding parameter in the signature of the determined service interface having a compatible type.

18. The system of claim 12, wherein the indication of the error is made in a development environment to enable a developer to correct the error in compatibility.

19. The system of claim 12, wherein the runtime environment comprises a client runtime environment executing in a client system, wherein one target component and server interfaces therein execute in a remote server in communication with the client system over a network, wherein the operations further comprise:

generating a binding of a name of each service interface associated with one client interface in the mapping to an implementation of the service interface in the remote server to enable transmission of a call to the service interface to the remote server to execute in the remote server.

20. The system of claim 19, wherein a service provider enables access to service interfaces on the remote server that are bound to service interfaces called in the client runtime environment, wherein the operations further comprise:

updating, by the service provider, functionality of service interfaces in the server that are bound to services interfaces in one client environment; and deploying the updated service interfaces, wherein the updated service interfaces remain compatible with the client interface associated in the mapping in the client runtime environment.

21. The system of claim 12, wherein the client interface and one service interface in the target component are compatible if methods in one service interface are a superset of methods in the client interface.

22. The system of claim 12, wherein a compatibility checker in a development environment performs the determining, for each client interface indicated in the data structure, whether there is one service interface in the target component associated with the client interface that is compatible with the client interface, wherein indicating the error comprises setting an error indicator to use for subsequent debugging operations by a development tool.

23. An article of manufacture comprising a computer readable storage medium including code executed by a processor for communicating with a client component, including at least one client interface and a target component including at least one service interface, wherein the code is capable of causing operations to be performed, the operations comprising;

providing a client component including at least one client interface, wherein the client components are loaded in a runtime environment;

providing a target component including at least one service interface;

providing a data structure for the client component associating at least one client interface in the client component with one target component;

determining in the runtime environment, for each client interface indicated in the data structure, whether there is one service interface in the target component associated with the client interface that is compatible with the client interface, wherein the service interface in the target component associated with the client interface implements a functionality of the associated client interface in the target component;

generating a mapping in the runtime environment associating each client interface indicated in the data structure with one compatible service interface in the target component and associating each parameter of the client interface indicated in the data structure with one parameter of the compatible service interface associated in the mapping;

using the mapping in response to a call in the runtime environment to one client interface indicated in the mapping to generate a call to the service interface associated in the mapping with the client interface;

mapping each parameter in the called client interface to one parameter in the generated call to the service interface, wherein the call to the service interface is executed to implement the call to the client interface; and indicating in the data structure an error for one client interface indicated in the data structure in response to determining that the client interface is not compatible with one service interface in the target component associated with the client interface.

24. The article of manufacture of claim 23, wherein at least one reference identifies one client interface and a target component including one service interface corresponding to the identified client interface, wherein the data structure includes at least one reference to specify that the identified client interface is implemented in one service interface in the target component.

25. The article of manufacture of claim 23, wherein determining whether there is one service interface in the target component associated with the client interface comprises:

analyze operations of the client interface in the client component; and analyze operations of at least one service interface in the associated target component; and determining one service interface having operations implementing the operations of the client interface.

26. The article of manufacture of claim 25, wherein the client interface is coded in a first computer language and the service interfaces in the target component are coded in a second computer language.

27. The article of manufacture of claim 25, wherein the at least one client interface has a signature identifying parameters of the client interface and wherein the at least one service interface has a signature identifying parameters of the service interface, further comprising:

determining whether the signature of the determined service interface is compatible with the signature of the client interface.

28. The article of manufacture of claim 27, wherein determining whether the signatures of the determined service interface and client interface are compatible comprises determining whether for each parameter of the client interface there is one corresponding parameter in the signature of the determined service interface having a compatible type.

29. The article of manufacture of claim 23, wherein the indication of the error is made in a development environment to enable a developer to correct the error in compatibility.

30. The article of manufacture of claim 23, wherein the runtime environment comprises a client runtime environment executing in a client system, wherein one target component and server interfaces therein execute in a remote server in communication with the client system over a network, further comprising:

generating a binding of a name of each service interface associated with one client interface in the mapping to an implementation of the service interface in the remote sewer to enable transmission of a call to the service interface to the remote sewer to execute in the remote server.

31. The article of manufacture of claim 30, wherein a service provider enables access to service interfaces on the remote server that are bound to service interfaces called in the client runtime environment, further comprising:
   updating, by the service provider, functionality of service interfaces in the server that are bound to services interfaces in one client environment; and
   deploying the updated service interfaces, wherein the updated service interfaces remain compatible with the client interface associated in the mapping in the client runtime environment.

32. The article of manufacture of claim 23, wherein the client interface and one service interface in the target component are compatible if methods in one service interface are a superset of methods in the client interface.

33. The article of manufacture of claim 23, wherein a compatibility checker in a development environment performs the determining, for each client interface indicated in the data structure, whether there is one service interface in the target component associated with the client interface that is compatible with the client interface, wherein indicating the error comprises setting an error indicator to use for subsequent debugging operations by a development tool.

* * * * *

UNITED STATES PATENT AND TRADEMARK OFFICE
CERTIFICATE OF CORRECTION

PATENT NO. : 7,594,217 B2
APPLICATION NO. : 11/007753
DATED : September 22, 2009
INVENTOR(S) : Beisiegel et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 851 days.

Signed and Sealed this

Twenty-eighth Day of September, 2010

David J. Kappos
*Director of the United States Patent and Trademark Office*